United States Patent
Lesonen et al.

(10) Patent No.: US 10,042,492 B2
(45) Date of Patent: Aug. 7, 2018

(54) APPARATUS AND/OR METHOD

(71) Applicant: Nokia Technologies Oy, Espoo (FI)

(72) Inventors: Janne Lesonen, Helsinki (FI); Esa Makelainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/109,459

(22) PCT Filed: Dec. 3, 2014

(86) PCT No.: PCT/FI2014/050948
§ 371 (c)(1),
(2) Date: Jul. 1, 2016

(87) PCT Pub. No.: WO2015/101704
PCT Pub. Date: Jul. 9, 2015

(65) Prior Publication Data
US 2016/0328049 A1 Nov. 10, 2016

(30) Foreign Application Priority Data
Jan. 2, 2014 (GB) .................................... 1400011.1

(51) Int. Cl.
*G06F 3/044* (2006.01)

(52) U.S. Cl.
CPC .... *G06F 3/044* (2013.01); *G06F 2203/04103* (2013.01); *G06F 2203/04107* (2013.01); *G06F 2203/04111* (2013.01)

(58) Field of Classification Search
CPC ........... G06F 3/044; G06F 2203/04107; G06F 2203/04111; G06F 2203/04103; G02F 1/13338
See application file for complete search history.

(56) References Cited

U.S. PATENT DOCUMENTS

| | | | |
|---|---|---|---|
| 2010/0220071 A1 | 9/2010 | Nishihara et al. | 345/173 |
| 2011/0063265 A1 | 3/2011 | Kim | 345/205 |
| 2011/0090159 A1 | 4/2011 | Kurashima | 345/173 |
| 2012/0170283 A1 | 7/2012 | Kobayashi et al. | 362/351 |
| 2014/0218328 A1* | 8/2014 | Haapakoski | G02F 1/13338 345/174 |

* cited by examiner

*Primary Examiner* — Richard Hong
(74) *Attorney, Agent, or Firm* — Harrington & Smith

(57) ABSTRACT

An apparatus including a notched shield electrode portion including a notch at an edge; and an overlapping shield electrode portion, wherein the overlapping shield electrode portion overlaps the notch in the notched shield electrode portion.

21 Claims, 3 Drawing Sheets

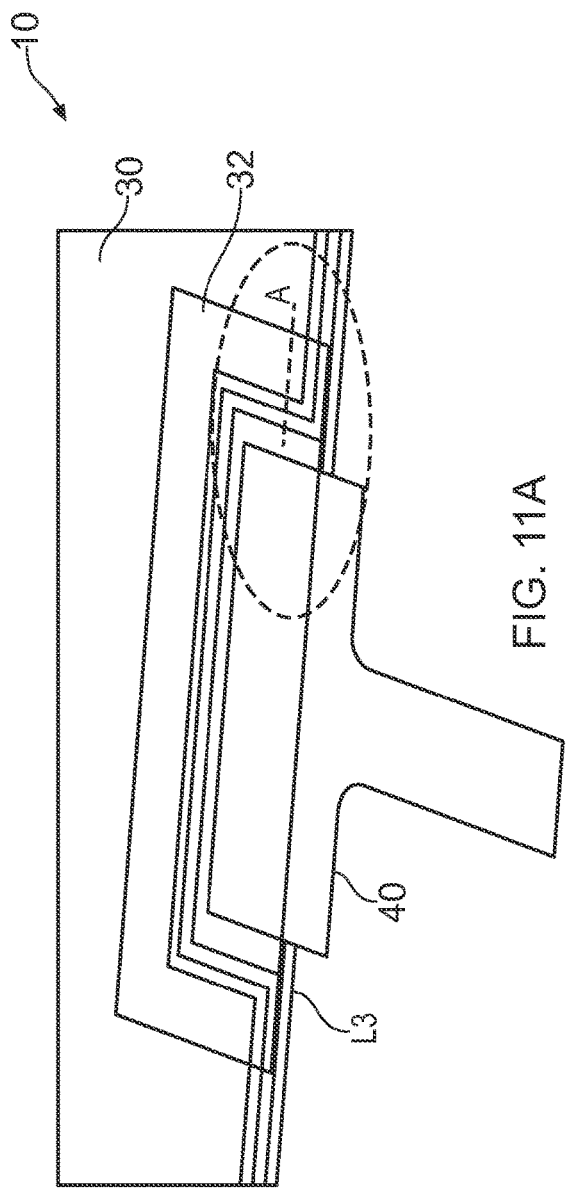
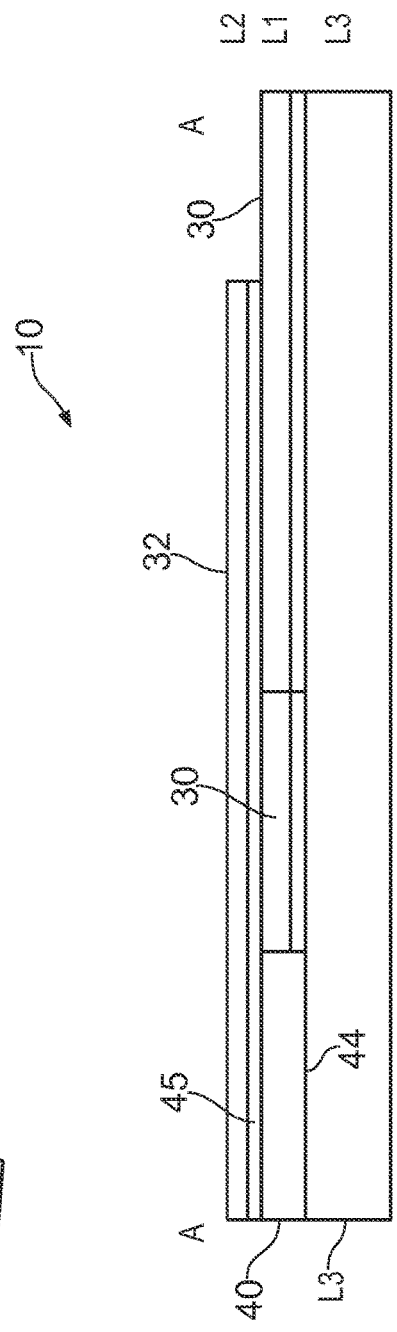
FIG. 11A
FIG. 11B

APPARATUS AND/OR METHOD

TECHNOLOGICAL FIELD

Embodiments of the present invention relate to an apparatus and/or method. In particular, they relate to electromagnetic shielding of capacitive sensor electrodes distributed over a sensing area.

BACKGROUND

Current touch sensitive displays may use a plurality of capacitive sensor electrodes distributed over a sensing area. The capacitive sensor electrodes sense a proximal grounded object such as a user's finger touching or approaching a sensing area.

BRIEF SUMMARY

According to various, but not necessarily all, embodiments of the invention there is provided an apparatus comprising: a notched shield electrode portion comprising a notch at an edge; and an overlapping shield electrode portion, wherein the overlapping shield electrode portion overlaps the notch in the notched shield electrode portion.

According to various, but not necessarily all, embodiments of the invention there is provided a method comprising: providing a notched electrically conductive portion, wherein the notched electrically conductive portion comprises a notch at an edge of the portion; providing a further electrically conductive portion overlapping the notch of the notched electrically conductive portion; providing for the electrical interconnection of the notched electrically conductive portion and the further electrically conductive portion to form a shield electrode for capacitive touch sensing.

BRIEF DESCRIPTION

For a better understanding of various examples that are useful for understanding the brief description, reference will now be made by way of example only to the accompanying drawings in which:

FIG. 11A illustrates an example of an apparatus from a top perspective view;

FIG. 11B is a cross-sectional view along section A-A of FIG. 11A.;

DETAILED DESCRIPTION

Figure 1:
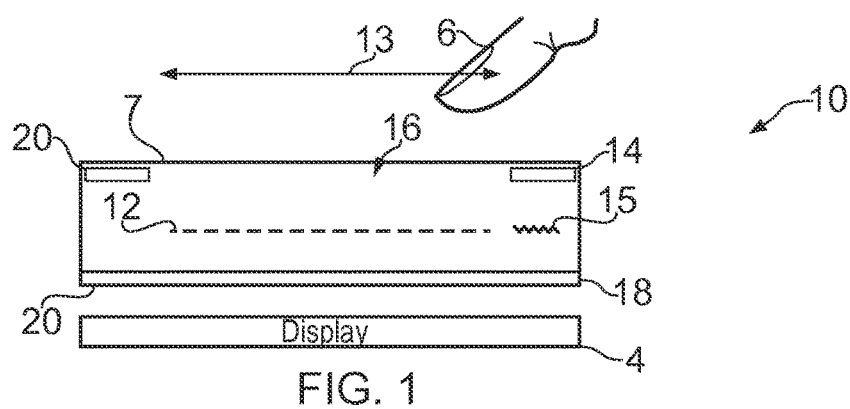
FIG. 1 illustrates an example of an apparatus comprising capacitive sensor electrodes and one or more shield electrodes.

FIG. 1 illustrates an example of an apparatus 10 comprising: a plurality of capacitive sensor electrodes 12 distributed over a sensing area 13; conductive traces 15, for the capacitive sensor electrodes 12, at least partially distributed over the sensing area 13; and an upper shield electrode 14 overlying the conductive traces 15.

In this example, the apparatus 10 overlies a display 4 and operates as a capacitive touch panel for the display 4. The display 4 and the apparatus 10 in combination form a touch sensitive display configured to detect a variation in capacitance arising from proximity of a user input device 6 to one or more of the plurality of capacitive sensor electrodes 12.

The apparatus 10 is configured to sense a variation in capacitance arising from proximity of a user input device 6 at or over the sensing area 13 of a touch surface 7. In this example the user input device 6 is a user's finger. However, it may alternatively be a stylus or other conductive object.

The apparatus 10 is configured to sense not only the (x, y) position of the user input device 6 within the sensing area 13 when it touches the sensing area 13 of the touch surface 7 but may also, in this example, additionally provide a (z) position of the user input device 6 when it is close to but not touching the sensing area 13 of the touch surface 7 and/or provide an (x, y) position of the user input device 6 when it is close to but not yet touching the sensing area 13 of the touch surface 7. The apparatus 10 therefore provides for not only two-dimensional sensing but also three-dimensional sensing.

Optionally, the apparatus 10 may also comprise a further lower shield electrode 18 underlying, in the sensing area 13, the conductive traces 15 and the capacitive sensor electrodes 12.

The shield electrodes 20 (the upper shield electrode 14 and/or the lower shield electrode 18) are formed from electrically conductive material and provide electro-magnetic shielding to the conductive traces 15 and the capacitive sensor electrodes 12.

The upper shield electrode 14 is not a continuous uninterrupted electrode that extends across the sensing area 13, but instead it may comprise a large aperture 16 aligned with the sensing area 13 or multiple smaller apertures 16 aligned with individual capacitive sensor electrodes 12.

The lower shield electrode 18, if present, may be a continuous uninterrupted electrode that extends across the sensing area 13.

The shield electrodes 20, the conductive traces 15, and the capacitive sensor electrodes 12 overlie, in this example, a display 4. As they overlie a display 4 they are preferably transparent or, if not transparent, they may be of a size that is not normally resolved by the human eye at a working distance of, for example, 30 cm.

The shield electrodes 20, the conductive traces 15, and the capacitive sensor electrodes 12 may be formed from conductive and transparent material. They may be formed from the same or similar material or mixtures of materials.

Examples of suitable conductive and transparent materials include, for example, Indium-Tin-Oxide (ITO), metal mesh, silver nanowires and carbon nanotube composite.

In some, but not necessarily all examples, the plurality of capacitive sensor electrodes 12 may be distributed over the sensing area 13 as an N row by M column array. In some, but not necessarily all examples, the array is a regular array in which because the rows are evenly spaced and also the columns are evenly spaced. The respective spacing between rows and the spacing between columns may be the same or different. The capacitive sensor electrodes 12 may be in a common single layer or, alternatively, may be in multiple different layers.

In some, but not necessarily all examples, the capacitive sensor electrodes 12 may have sizes less than 0.5 $cm^2$. They may for example have dimensions of less than 6 mm by 6 mm.

Figure 2:
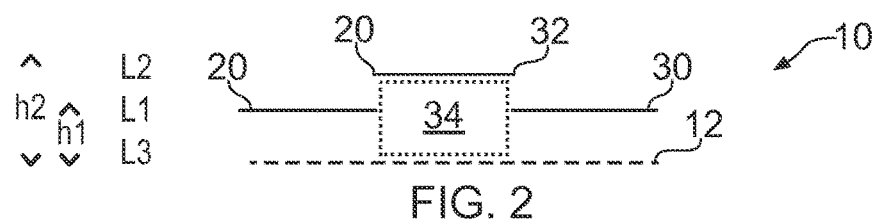
FIG. 2 illustrates in cross-section an example of a multi-layered shield electrode.

FIG. 2 illustrates, in cross-section, an example of a shield electrode 20. In this example, the shield electrode 20 is multi-layered. Portions of the shield electrode 20 occupy different layers in the apparatus 10.

A notched shield electrode portion 30 occupies a first layer L1 and an overlapping shield electrode portion 32 occupies a second layer L2.

In this example, the multi-layered shield electrode 20 operates as an upper shield electrode 14 and is positioned above a plurality of capacitive sensor electrodes 12 in a third layer L3. However, in other examples, the shield electrode 20 may instead be a lower shield electrode 18, in which case it would be positioned underneath the capacitive sensor electrodes 12 in the third layer L3.

The first layer L1 comprising the notched shield electrode portion 30 is separated from the third layer L3 comprising the plurality of capacitive sensor electrodes 12 by a distance h1. The second layer L2 comprising the overlapping shield electrode portion 32 is separated from the third layer comprising the capacitive sensor electrodes 12 by a distance h2. The separation distance h2 is greater than the separation distance h1.

Figure 3A:
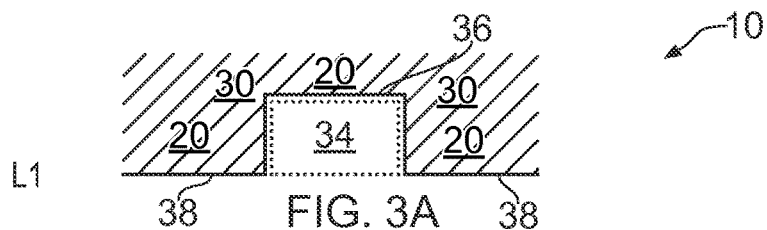
FIG. 3A illustrates a top perspective view of a first layer of a multi-layered shield electrode.

FIG. 3A illustrates a top perspective view of the first layer L1 comprising the notched shield electrode portion 30. The notched shield electrode portion 30 is identified using hatched shading in FIG. 3A. The notched shield electrode portion 30 has a notch 36 at one edge 38 of the shield electrode.

Figure 3B:
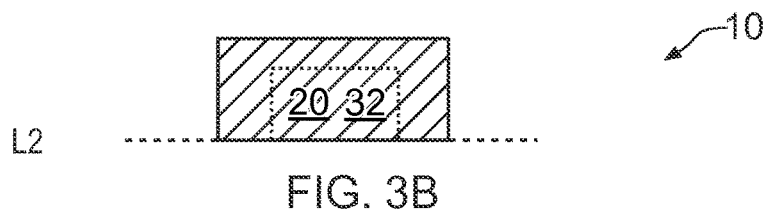
FIG. 3B illustrates a top perspective view of a second layer of a multi-layered shield electrode.

FIG. 3B illustrates a top perspective view of the second layer L2 comprising the overlapping shield electrode portion 32. The perimeter of the notched shield electrode portion 30 in the underlying layer L1 is illustrated in FIG. 3B using a dotted line. The overlapping shield electrode portion 32 is identified using hatched shading in FIG. 3B.

Referring to FIG. 2 and FIG. 3A, the notch 36 in the notched shield electrode portion 30 defines a cavity 34 that occupies at least the first layer L1. In this example, the cavity 34 extends from the second layer L2 comprising the overlapping shield electrode portion 32 to the third layer L3 comprising the capacitive sensor electrodes 12.

Therefore in this example the height of the cavity 34 is equivalent to h2 and is greater than h1.

Referring back to FIG. 3B, the edge 38 of the notched shield electrode portion 30 is illustrated using a dashed line. It will be appreciated that the edge is notched by the notch 36. The area of the overlapping shield electrode portion 32 is greater than the area of the notch 36. The overlapping shield electrode portion 32 is positioned so that it entirely overlaps the notch 36 in the notched shield electrode portion 30.

In this example, but not necessarily all examples, the notch 36 has a rectangular shape and the overlapping shield electrode portion 32 also has a rectangular shape, of greater dimensions.

It will therefore be appreciated that the overlapping shield electrode portion 32 may entirely overlap the cavity 34.

When viewed from a top perspective view, the notched shield electrode portion 30 and the overlapping shield electrode portion 32 completely cover the area required for the upper shield electrode 14.

Figure 4:
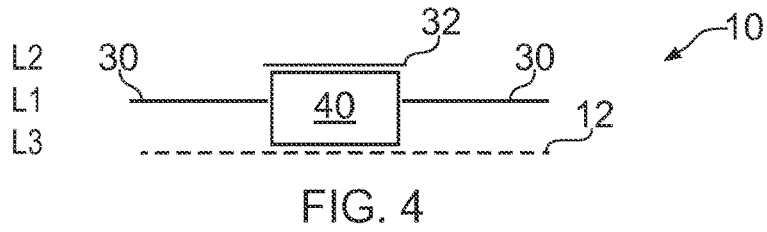
FIG. 4 illustrates an example of the apparatus comprising an electrical interface connector received within a cavity.

FIG. 4 illustrates an example of the apparatus 10, as previously described, with an electrical interface connector 40 within the cavity 34. The interface connector 40 may be, for example, a flexible printed circuit (FPC).

The purpose of the interface connector 40 is to provide electrical connections at least between the conductive traces 15 and detection circuitry. The conductive traces 15 are connected or connectable to the respective plurality of capacitive sensor electrodes 12 and the detection circuitry is configured to detect changes in capacitance at the plurality of capacitive sensor electrodes 12 of the apparatus 10.

Figures 5, 6:
FIG. 5 illustrates an example of an interface connector.
FIG. 6 illustrates an example of a transparent shield electrode.

As illustrated in FIG. 5, the interface connector 40 has a height H. The height H, in this example, is greater than the separation h1 and it is less than or equal to the separation h2.

The height H may, in some but not necessarily all examples, be of the order 115 μm and the separation h1 may be, in some but not necessarily all examples, be of the order 75 μm.

The interface connector 40 may make an electrical connection with the conductive traces 15 in the third layer L3 via, for example, a lower side 44 of the interface connector 40.

The interface connector 40 may make an electrical connection with the notched shield electrode portion 30 at the first layer L1 and/or may make an electrical connection with the overlapping shield electrode portion 32 at the second layer L2. For example, an upper surface 45 of the interface connector 40 may interconnect with the overlapping shield electrode portion 32.

The electrical interconnections between the interface connector 40 and the shield electrode 20 and/or the conductive traces 15 may be achieved using conductive particles in a binder, for example using anisotropic conductive film (ACF).

FIG. 6 illustrates an example of a shield electrode 20 such as, for example, the notched shield electrode portion 30 and/or the overlapping shield electrode portion 32. In this example, a conductive material 52 is attached to a substrate 50. In some examples, the substrate 50 may be transparent. In some examples, the conductive material 52 may be transparent or semi transparent. For example, it may be formed from indium tin oxide (ITO), or other conductive and transparent material for example as previously described.

Figure 7:
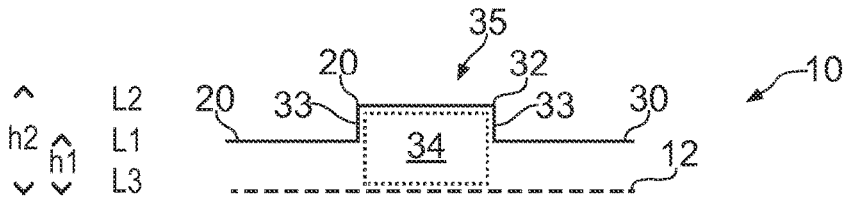
FIG. 7 illustrates in cross-section another example of a multi-layered shield electrode.

FIG. 7 illustrates, in cross-section, an example of a multi-layered shield electrode 20 similar to that illustrated in FIG. 2. The description above given in relation to FIG. 2 and the features referenced in FIG. 2, is also applicable for FIG. 7. The multi-layered shield electrode 20 of FIG. 7 is different from the multi-layered shield electrode 20 of FIG. 2 in that the portions of the multi-layered shield electrode 20 that occupy different layers in the apparatus 10 are electrically interconnected via an intermediate conductive portion formed from one or more electrical interconnects 33.

Figure 8A:
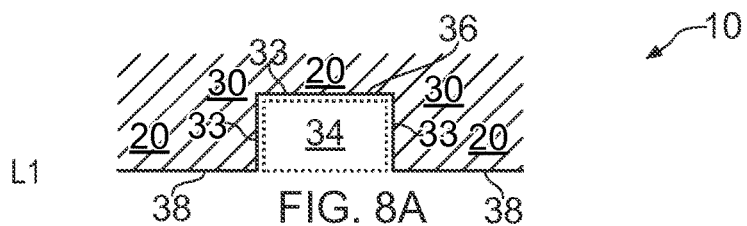
FIG. 8A illustrates a top perspective view of a first layer of the multi-layered shield electrode of FIG. 7.
Figure 8B:
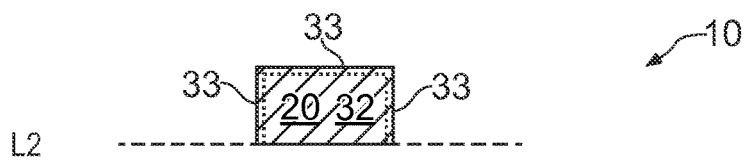
FIG. 8B illustrates a top perspective view of a second layer of a multi-layered shield electrode of FIG. 7.

The notched shield electrode portion 30, which occupies the first layer L1, and the overlapping shield electrode portion 32, which occupies the second layer L2, are physically and electrically interconnected via electrical interconnects 33 that extend between the first layer L1 and the second layer L2. FIG. 8A illustrates a top perspective view of the first layer L1 comprising the notched shield electrode portion 30. FIG. 8B illustrates a top perspective view of the second layer L2 comprising the overlapping shield electrode portion 32.

The electrical interconnects 33 in combination with the overlapping shield electrode portion 32 form a bridge 35 over the notch 36 in the notched shield electrode portion 30.

In this example the cavity 34 extends from the second layer L2 comprising the overlapping shield electrode portion 32 to the third layer L3 comprising the capacitive sensor electrodes 12 and is bounded at its three sides, by the electrical interconnects 33.

Figure 9:
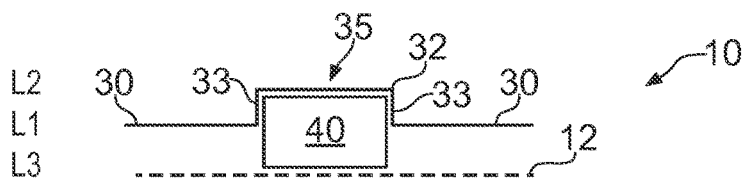
FIG. 9 illustrates an example of the apparatus of FIG. 7 comprising an electrical interface connector received within a cavity.
Figure 10:
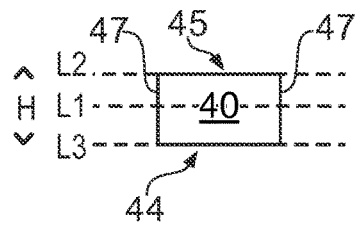
FIG. 10 illustrates an example of the interface connector of FIG. 9.

FIG. 9 illustrates an example of the apparatus 10, as previously described in relation to FIGS. 7, 8A and 8B. An electrical interface connector 40 is within the cavity 34. The electrical interface connector is illustrated in more detail in FIG. 10. The description above given in relation to FIG. 4 and FIG. 5 and the features referenced in FIG. 4 and FIG. 5, is also applicable for FIG. 9 and FIG. 10.

The interface connector 40 may make an electrical connection with the conductive traces 15 in the third layer L3 via, for example, a lower side 44 of the interface connector 40.

The interface connector 40 may make an electrical connection with the notched shield electrode portion 30 at the first layer L1 and/or may make an electrical connection with the overlapping shield electrode portion 32 at the second layer L2. For example, an upper surface 45 of the interface connector 40 may interconnect with the overlapping shield electrode portion 32.

The interface connector 40 may make an electrical connection with the electrical interconnects 33 via, for example, one or more lateral sides 47 of the interface connector 40.

The electrical interconnections between the interface connector 40 and the shield electrode 20 and/or the conductive traces 15 may be achieved using conductive particles in a binder, for example using anisotropic conductive film (ACF).

FIGS. 11A and 11B illustrate another example of an apparatus 10. The description given above in relation to FIGS. 1 to 10 and the features referenced in FIGS. 1 to 10 are also applicable for FIGS. 11A and 11B.

FIG. 11A illustrates a top perspective view of the apparatus 10. FIG. 11B is a cross-sectional view along section A-A of FIG. 11A.

The apparatus 10 comprises a multi-layered shield electrode 20 comprising a notched shield electrode portion 30 (in the first layer L1) and an overlapping shield electrode portion 32 (in the second layer L2). The apparatus 10 also comprises a plurality of capacitive sensor electrodes 12 (not illustrated in the FIG.) in a third layer L3. The first layer L1 is between the second layer L2 and the third layer L3.

The first layer L1 also comprises an electrical interface connector 40. The interface connector 40 may be, for example, a flexible printed circuit (FPC).

The interface connector 40 may make an electrical connection with the conductive traces in the third layer L3 via, for example, a lower side 44 of the interface connector 40.

The interface connector 40 may make an electrical connection with the overlapping shield electrode portion 32 at the second layer L2. For example, an upper surface 45 of the interface connector 40 may interconnect with the overlapping shield electrode portion 32.

The electrical interconnections between the interface connector 40 and the shield electrode 20 and/or the conductive traces 15 may be achieved using conductive particles in a binder, for example using anisotropic conductive film (ACF).

In the above described examples, an impression may have been given that the connector 40 is added to the apparatus 10 after the cavity 34 has been enclosed above and below. This is not necessarily the case.

For example, the connector 40 may be added to the first layer L1 before the overlapping shield electrode portion 32 of the second layer L2 is added.

For example, the connector 40 may be added to the first layer L1 before the third layer L3 is added.

For example, the connector 40 may form the overlapping shield electrode portion 32 of the second layer L2. In this example, the connector may be shaped so that it occupies both the first layer L1 and the second layer L2. Where it occupies the second layer L2 it forms the overlapping shield electrode portion 32. The portion of the connector 40 that occupies the second layer L2 may, in this case, be wider than the portion of the connector 40 that occupies the recess 34 of the first layer L1. This may be achieved using a multi-layer flexible printed circuit (FPC). A flexible printed circuit (FPC) that occupies the first layer L1 may be laminated to another flexible printed circuit (FPC) that occupies the second layer L2.

Figure 12A:
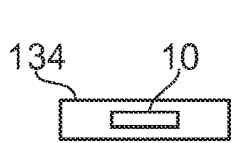
FIG. 12A illustrates an example of a touch panel module comprising the apparatus.

FIG. 12A illustrates an example of a touch panel module 134 that comprises the apparatus 10. The touch panel module 134 may be used in combination with a display to form a touch screen display.

Figure 12B:
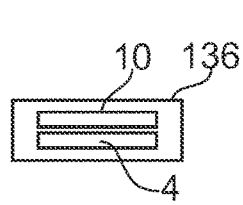
FIG. 12B illustrates an example of a touch sensitive display module comprising the apparatus.

FIG. 12B illustrates an example of a touch sensitive display module 136 that comprises the apparatus 10 and a display 4.

Figure 12C:
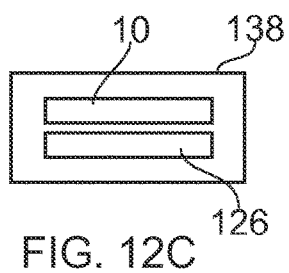
FIG. 12C illustrates an example of a electronic device comprising the apparatus.

FIG. 12C illustrates an example of an electronic device 138 that comprises at least the apparatus 10. The apparatus 10 may or may not be provided as part of a touch panel module 134 or a touch sensitive display module 136. The electronic device 138 may, for example, additionally comprise detection circuitry 126 configured to detect changes in capacitance at the plurality of capacitive sensor electrodes 12 of the apparatus 10.

As used here 'module' refers to a unit or apparatus that excludes certain parts/components that would be added by an end manufacturer or a user The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    a notched shield electrode portion comprising a notch at an edge, wherein the notched shield electrode portion comprises an aperture configured to be aligned with a sensing area of the apparatus, and wherein a majority of a periphery of the notch is surrounded by the notched shield electrode portion; and
    an overlapping shield electrode portion, wherein the overlapping shield electrode portion overlaps the notch in the notched shield electrode portion.

2. An apparatus as claimed in claim 1, wherein the notched shield electrode portion occupies a first layer and the overlapping shield electrode portion occupies a second, different layer.

3. An apparatus as claimed in claim 2, wherein the apparatus further comprises capacitive sensor electrodes in a third layer, wherein the first layer is positioned between the second layer and the third layer.

4. An apparatus as claimed in claim 1, wherein an area of the overlapping shield electrode portion is greater than an area of the notch in the notched shield electrode portion.

5. An apparatus as claimed in claim 1, wherein the overlapping shield electrode portion completely overlaps the notch of the notched shield electrode portion.

6. An apparatus as claimed in claim 1, wherein the notch in the notched shield electrode portion has a first two-dimensional shape and wherein the overlapping shield electrode portion has a larger first two-dimensional shape.

7. An apparatus as claimed in claim 1, wherein the notched shield electrode portion and the overlapping shield electrode portion are electrically interconnected.

8. An apparatus as claimed in claim 7 wherein the notched shield electrode portion and the overlapping shield electrode portion are electrically interconnected via an intermediate conductive portion as a bridge.

9. An apparatus as claimed in claim 1 further comprising an additional shield electrode.

10. An apparatus as claimed in claim 1, wherein the notched shield electrode portion and the overlapping shield electrode portion are formed from transparent conductive material.

11. An apparatus as claimed in claim 1, wherein the apparatus comprises a cavity defined by the notch of the notched shield electrode portion.

12. An apparatus as claimed in claim 1 further comprising an electrical interface connector positioned within the notch of the notched shield electrode portion.

13. An apparatus as claimed in claim 12, wherein the electrical interface connector comprises a flexible printed circuit.

14. An apparatus as claimed in claim 12, wherein the electrical interface connector has a height that is greater than a distance between the notched shield electrode portion and a layer of capacitive sensor electrodes.

15. An apparatus as claimed in claim 14, wherein the height is less than or equal to the distance between the overlapping shield electrode portion and the layer of capacitive sensor electrodes.

16. An apparatus as claimed in claim 12, wherein the electrical interface connector connects to one or more of the notched shield electrode portion and the overlapping shield electrode portion and in addition connects to a layer comprising capacitive sensor electrodes.

17. An apparatus as claimed in claim 12, wherein the electrical interface connector comprises a lower surface for interconnection with a layer comprising capacitive sensor electrodes and an upper surface for interconnection with the overlapping shield electrode portion.

18. An apparatus as claimed in claim 1, wherein the notched shield electrode portion comprises the notch at only one edge of the notched shield electrode portion.

19. A method comprising:
    providing a notched electrically conductive portion, wherein the notched electrically conductive portion comprises a notch at an edge of the portion, wherein the notched electrically conductive portion comprises an aperture configured to be aligned with a sensing area of an apparatus, and wherein a majority of a periphery of the notch is surrounded by the notched electrically conductive portion;
    providing a further electrically conductive portion overlapping the notch of the notched electrically conductive portion;
    providing for the electrical interconnection of the notched electrically conductive portion and the further electrically conductive portion to form a shield electrode for capacitive touch sensing.

20. A method as claimed in claim 19, further comprising providing a plurality of capacitive sensor electrodes wherein the notched conductive portion is positioned between the conductive portion overlapping the notch and the capacitive sensor electrodes.

21. A method as claimed in claim 19, further comprising inserting an electrical interface connector within the notch so that it is positioned between the conductive portion overlapping the notch and a layer comprising capacitive sensor electrodes.

* * * * *